(12) United States Patent
Nechyba (10) Patent No.: US 8,559,684 B1
(45) Date of Patent: Oct. 15, 2013

(54) FACIAL RECOGNITION SIMILARITY THRESHOLD ADJUSTMENT

(71) Applicant: Michael Christian Nechyba, Pittsburgh, PA (US)

(72) Inventor: Michael Christian Nechyba, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/645,087

(22) Filed: Oct. 4, 2012

Related U.S. Application Data (60) Provisional application No. 61/683,617, filed on Aug. 15, 2012.

(51) Int. Cl.
G06K 9/00 (2006.01)

(52) U.S. Cl.
USPC .......................................................... 382/118

(58) Field of Classification Search
None
See application file for complete search history.

(56) References Cited

U.S. PATENT DOCUMENTS 5,164,992 A * 11/1992 Turk et al. ..................... 382/118
5,710,833 A * 1/1998 Moghaddam et al. ........ 382/228
5,850,470 A * 12/1998 Kung et al. ................... 382/157

2002/0136433 A1 9/2002 Lin
2005/0063569 A1 3/2005 Colbert et al.
2008/0192991 A1 8/2008 Gremse et al.

OTHER PUBLICATIONS

Lin et al., "Face Recognition/Detection by Probabilistic Decision-Based Nural Network," IEEE Tranactions on Neural Networks, vol. 8 No. 1, Jan. 1997, pp. 114-132.
Turk et al., "Eigenfaces for Recognition," Journal of Cognitive Neuroscience, vol. 3 No. 1, 1991, (retrieved on Nov. 4, 2011), 16 pp.

* cited by examiner

Primary Examiner — Samir Ahmed
(74) Attorney, Agent, or Firm — Shumaker & Sieffert, P.A.

(57) ABSTRACT

In general, aspects of the present disclosure are directed to techniques for adjusting the threshold similarity score to match the facial features of an authorized user in a facial recognition system. Instead of a uniform threshold similarity score, representations of authorized faces enrolled in the computing device may be assigned a custom threshold similarity score based at least in part on the distinctiveness of the facial features in the representations of the authorized faces. A computing device can determine a distinctiveness of facial features of an enrolling user, and can determine a threshold similarity score associated with the facial features of the enrolling user based at least in part on the distinctiveness of the facial features of the enrolling user.

27 Claims, 4 Drawing Sheets

FACIAL RECOGNITION SIMILARITY THRESHOLD ADJUSTMENT

This application claims the benefit of U.S. Provisional Application No. 61/683,617, filed Aug. 15, 2012, the entire content of which is incorporated herein in its entirety.

BACKGROUND

A facial recognition system may authenticate a user to grant access to a computing device (e.g., a mobile computing device) by comparing facial features of the user to the facial features of users authorized to access the device. If the facial features of the user requesting access are similar enough to the facial features of a user authorized to access the device, the device may grant access to the requesting user.

SUMMARY

In one aspect, the disclosure is directed to a method for determining a threshold similarity score associated with the facial features of a user. The method may include determining a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the enrolling user. The method may further include determining, by a computing device, a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

In another aspect, the disclosure is directed to a device. The device may include at least one processor. The at least one processor may be configured to determine a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the enrolling user. The at least one processor may further be configured to determine a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

In another aspect, the disclosure is directed to a computer-readable storage medium containing instructions. The instructions, when executed on at least one processor, may cause the at least one processor to perform operations. The operations may include determining, by a computing device, a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the enrolling user. The operations may further include determining, by the computing device, a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for adjusting the threshold similarity score in a facial recognition process to unlock a computing device (e.g., mobile computing device). Similarity between facial features of users may be quantified using a similarity score, with higher similarity scores denoting greater degrees of similarity between facial features. If a similarity score in comparing facial features of two users is above a specified threshold similarity score, then the facial features of the two users may be deemed a match. In the context of facially unlocking a computing device, a similarity score between the facial features of a user attempting to facially unlock the computing device and the facial features of an authorized user can be determined. If the similarity score exceeds the threshold similarity score for the facial features of the authorized user, then the user is recognized as the authorized user of the computing device, and in response the computing device may be unlocked to enable the user to access one or more features of the computing device.

Some facial recognition techniques may determine whether the facial features of a user are deemed to match the facial features of an authorized user by determining if a similarity score indicating a degree of similarity between the facial features of the user and the facial features of the authorized user exceeds a default threshold similarity score. However, the facial features of users may differ in their distinctiveness, so that there are users with facial features that are relatively more distinctive, and users with facial features that are relatively less distinctive. If a facial recognition technique employs a uniform default threshold similarity score for authorized users regardless of the distinctiveness of the facial features of the user, an authorized user with relatively fewer distinctive facial features may receive more false positive matches than authorized users with relatively more distinctive facial features, given that users with relatively fewer distinctive facial features may tend to generate higher similarity scores than users with relatively more distinctive facial features. Therefore, facial recognition techniques may be modified to customize threshold similarity scores based on the distinctiveness of the facial features of authorized users, so that authorized users with relatively fewer distinctive facial features may be associated with a relatively higher threshold similarity score.

Determining a threshold similarity score for a user may usually occur as part of an enrollment process to enroll the user as an authorized user into a face repository for a facial recognition system, so that the user may be able to gain access or entry to resources or locations protected by the facial recognition system. A user may be enrolled in a face repository by extracting features of the user's face and adding the features of the user's face in a facial features database that stores the facial features of authorized users. One or more images of an enrolling user's face may be captured for features extraction. Although capturing a single image of the enrolling user's face may be sufficient for the enrollment process, capturing more than one image of the enrolling user's face may be useful for capturing variations in the user's facial expressions, as well as variations in environmental factors such as illumination, thereby increasing the accuracy of the facial recognition process. After capturing the one or more images of the enrolling user's face, facial features may be extracted from the one or more images. Facial features may include nose, eyes, mouth, nostrils, chins, forehead, eyebrows, cheekbones, and the like, including characteristics such as the position, size, and relationship among those features. Facial features may also include facial characteristics, such as lines, curves, edges, points, areas, and the like, as well as spatial frequencies of image intensities and colors on the face. The features extracted from the one or more images of the user's face may be stored in the facial features database as one or more face templates for the user in the face repository.

Determining a threshold similarity score for the user may include determining the distinctiveness of the user's facial features by comparing the user's facial features against the facial features of a diverse population of people with diverse facial features. If the user's facial features have a high average similarity score when compared with the diverse facial features of the population, then the user's facial features may be considered to be relatively less distinctive, and the user's facial features may be associated with a relatively higher threshold similarity score when determining whether there is a facial features match. Conversely, if the user's facial features have a low average similarity score when compared with the diverse facial features of the population, then the user's facial features may be considered to be relatively more distinctive, and the user's facial features may be associated with a relatively lower threshold similarity score. The relationship between the average similarity score of the user's facial features and its threshold similarity score may be linear or non-linear.

The population of people with diverse facial features may be built by taking a first person from a group whose features are the least distinctive in the group, taking a second person from the remaining group whose facial features are the least similar to the first person, taking a third person from the remaining group whose facial features are the least similar to the first two people, and so on, until a set of persons is formed. These and other aspects will be further described in more detail below.

Figure 1:
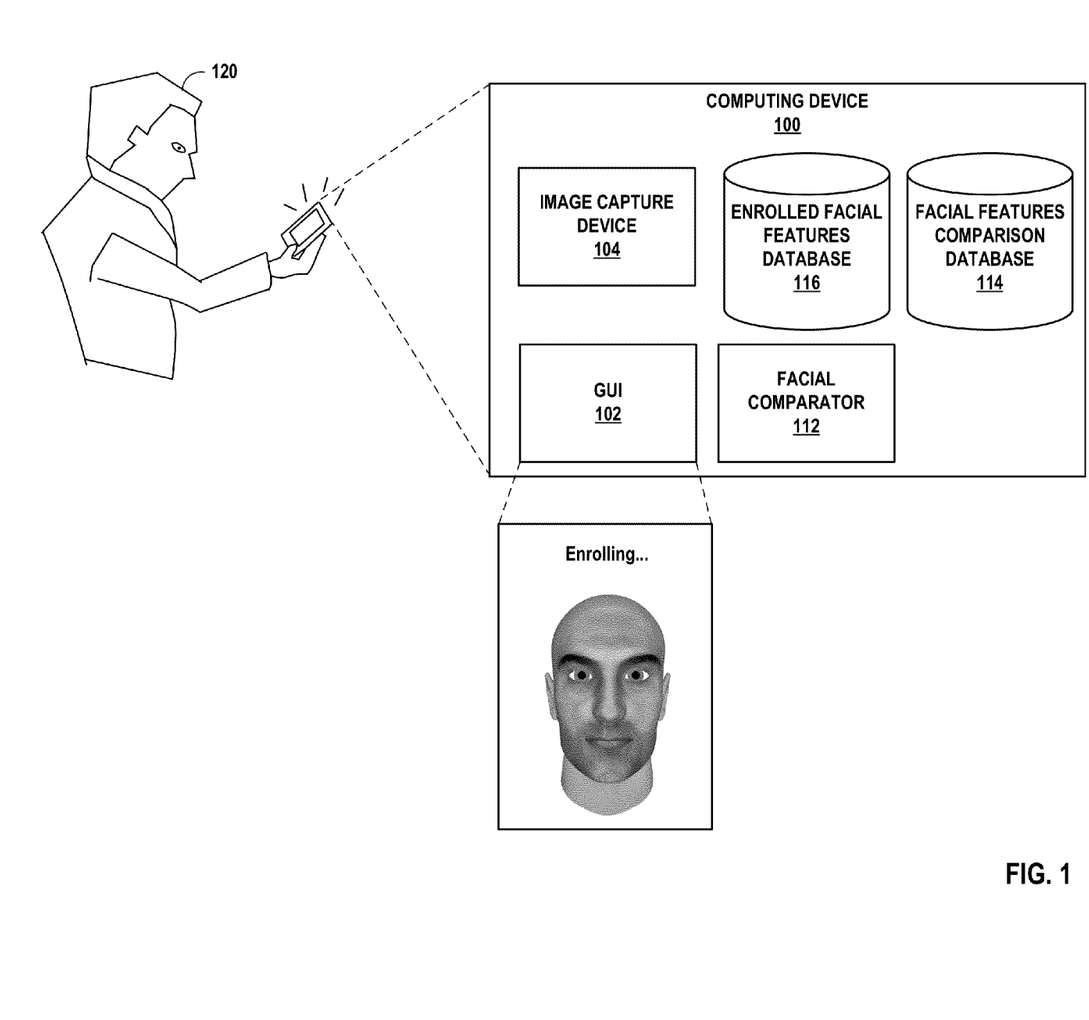
FIG. 1 is a conceptual diagram illustrating an example facial recognition enrollment technique according to one or more aspects of the present disclosure.

FIG. 1 is a conceptual diagram illustrating an example facial recognition enrollment technique according to some aspects of the present disclosure. As shown in FIG. 1, user 120 may enroll his facial features into a facial recognition system via computing device 100 so that user 120 is recognized as an authorized user by the facial recognition system.

Examples of computing device 100 may include, but are not limited to, portable or mobile computing devices such as mobile phones (including smart phones), laptop computers, personal digital assistants (PDA's), portable gaming devices, portable media players, and e-book readers, as well as desktop computers, set top boxes, gaming systems, televisions, and the like, including a combination of two or more of these items. Computing device 100 may include display 102 and image capture device 104. Image capture device 104 may be a camera, such as a digital camera, a still camera, a motion picture camera, and the like. Image capture device 104 may also be any other device capable of capturing and storing still or moving images. In some examples, image capture device 104 may be capable of digitally recording images via an electronic image sensor.

Display 102 may be capable of outputting a user interface that presents information to user 120. In some examples, display 102 may be a touch-sensitive display. The touch-sensitive display may be an output device in computing device 100 that displays graphical content responsive to electronic signaling or other directives from computing device 100. Graphical content, generally, may include any visual depiction displayed at the touch-sensitive display. Examples of graphical content may include images, text, videos, visual objects and/or visual program components such as scroll bars, text boxes, buttons, etc. The touch-sensitive display may also be an input device in computing device 100 that generates one or more signals corresponding to a location on or near the touch-sensitive display. In some examples, the touch-sensitive display may detect a presence of an input unit, e.g., a finger, pen or stylus that may be in close proximity to, but does not physically touch, the touch-sensitive display. As used herein, user "contact" may therefore refer to close proximity that is detected by the touch-sensitive display. In other examples, user "contact" may include physical contact with the touch-sensitive display to select the corresponding location, e.g., in the case of a touch-sensitive screen. The touch-sensitive display, in some examples, may generate a signal corresponding to the location of the input unit. Signals generated by the selection of the corresponding location(s) may then be provided as data to applications, and other components of computing device 100. In other examples, display 102 may be any other output device configured to present information in visual form.

User 120 may initiate enrollment into the facial recognition system by capturing one or more images of his face using image capture device 104, and display 102 may display the captured one or more images of the face of user 120. Computing device 100 may analyze the captured one or more images of the face of user 120 to extract facial features from captured images of user 120's face and may create one or more face templates associated with user 120's facial features. Computing device 100 may analyze the extracted facial features, including analyzing the one or more face templates associated with user 120's facial features, to determine the distinctiveness of user 120's facial features, and computing device 100 may adjust the threshold similarity score associated with user 120's face based at least in part on the distinctiveness of user 120's facial features. Alternatively, a remote system external to computing device 100 may receive user 120's facial features and may determine the distinctiveness of user 120's facial features.

During the enrollment process, user 120 may initially interact with computing device 100 to cause computing device 100 to enter an enrollment mode, so that user 120 may attempt to enroll with a facial recognition system of computing device 100 by registering his facial features with the facial recognition system as the facial features of an authorized user in the facial recognition system. During this enrollment process, image capture device 104 may capture one or more images of user 120, including capturing one or more images of user 120's face, and computing device 100 may analyze the one or more images of user 120's face captured by image capture device 104 to extract facial features of user 120's face. Facial features extracted by computing device 100 may include but are not limited to information regarding user 120's nose, eyes, mouth, nostrils, chins, forehead, eyebrows, cheekbones, and the like, including information regarding characteristics such as their position, size, and the relationship among those features. Facial features extracted by computing device 100 may also include information regarding facial characteristics, such as lines, curves, edges, points, areas, and the like of the face, as well as spatial frequencies of image intensities and colors on the face. Facial features extracted from the one or more images of user 120's face may be stored as one or more face templates in enrolled facial features database 116 in computing device 100 that may be used during a facial recognition authentication process.

Computing device 100 may extract the facial features of user 120, and facial comparator 112 may be configured to determine the distinctiveness of facial features by comparing the extracted facial features of user 120 to the facial features of a population of people with a diverse set of faces stored in facial features comparison database 114. For example, facial comparator 112 may compare one or more face templates associated with the facial features of user 120 with the face templates associated with the facial features stored in facial features comparison database 114. Based on the comparisons of user 120's facial features to the facial features stored in facial features comparison database 114, the threshold similarity score for user 120's facial features may be determined by computing device 100. The threshold similarity score associated with user 120's facial features may denote a level of similarity that must be exceeded for the facial features of another user to be considered a match with user 120's facial features, with a higher threshold similarity score requiring a higher level of similarity between facial features to be considered a match for the purposes of the facial recognition system of computing device 100.

The threshold similarity score may be determined based at least in part on a false positive match rate for user 120 at that threshold similarity score 108. For example, an acceptable false positive rate may be specified (e.g., 1 in 1,000,000 false positive matches), and the threshold similarity score may be determined for facial features of user 120 so that there is no more than the acceptable false positive match rate for facial features of user 120. For a given threshold similarity score, facial features that are less distinctive may have more false positive matches than facial features that are more distinctive because a user with facial features that are less distinctive may, for a given threshold similarity score, be considered a match with more users' facial features than a user with facial features that are more distinctive. Therefore, the threshold similarity score for facial features that are less distinctive may be set relatively higher than the threshold similarity score for facial features that are more distinctive in order for both threshold similarity scores to achieve the same false positive match rate.

Thus, the threshold similarity score associated with facial features of user 120 may inversely relate to the distinctiveness of facial features, so that facial features that are more distinctive may conversely have a relatively lower threshold similarity score, while facial features that are less distinctive may conversely have a relatively higher threshold similarity score. In some examples, the threshold similarity score associated with facial features of user 120 may be increased above a default threshold similarity score if the distinctiveness of facial features of user 120 is below a specified threshold. Conversely, in some examples, the threshold similarity score associated with facial features of user 120 may be decreased below a default threshold similarity score if the distinctiveness of facial features of user 120 is above a specified threshold. The relationship between the threshold similarity score of user 120's facial features and the distinctiveness of user 120's facial features may be either linear or non-linear.

If the facial features of user 120 are enrolled into the facial recognition system, a user may attempt to access one or more features of computing device 100 that is protected by the facial recognition system of computing device 100. For example, access to one or more applications running on computing device 100 may be protected by the facial recognition system. Alternatively, the facial recognition system may transition computing device 100 from a locked state to an unlocked state if the facial recognition system recognizes the facial features of the accessing user as the facial features of an authorized user. Image capture device 104 may capture one or more images of the accessing user, and computing device 100 may extract facial features of the accessing user from the captured images, including creating one or more face templates based on the facial features of the accessing user. The extracted facial features may be compared to the facial features of authorized users that are stored in enrolled facial features database 116, including comparing the face templates associated with the accessing user with face templates associated with the authorized users, and a similarity score may be generated for each comparison between the accessing user's facial features and an authorized user's facial features. If the similarity score for a comparison between the accessing user and the facial features of an authorized user exceeds the threshold similarity score for the facial features of that authorized user, then the accessing user may be recognized as that authorized user. Responsive to recognizing the accessing user as an authorized user, facial recognition system may grant the accessing user access to the one or more protected features of computing device 100, such as by unlocking the previously locked computing device 100.

Figure 2:
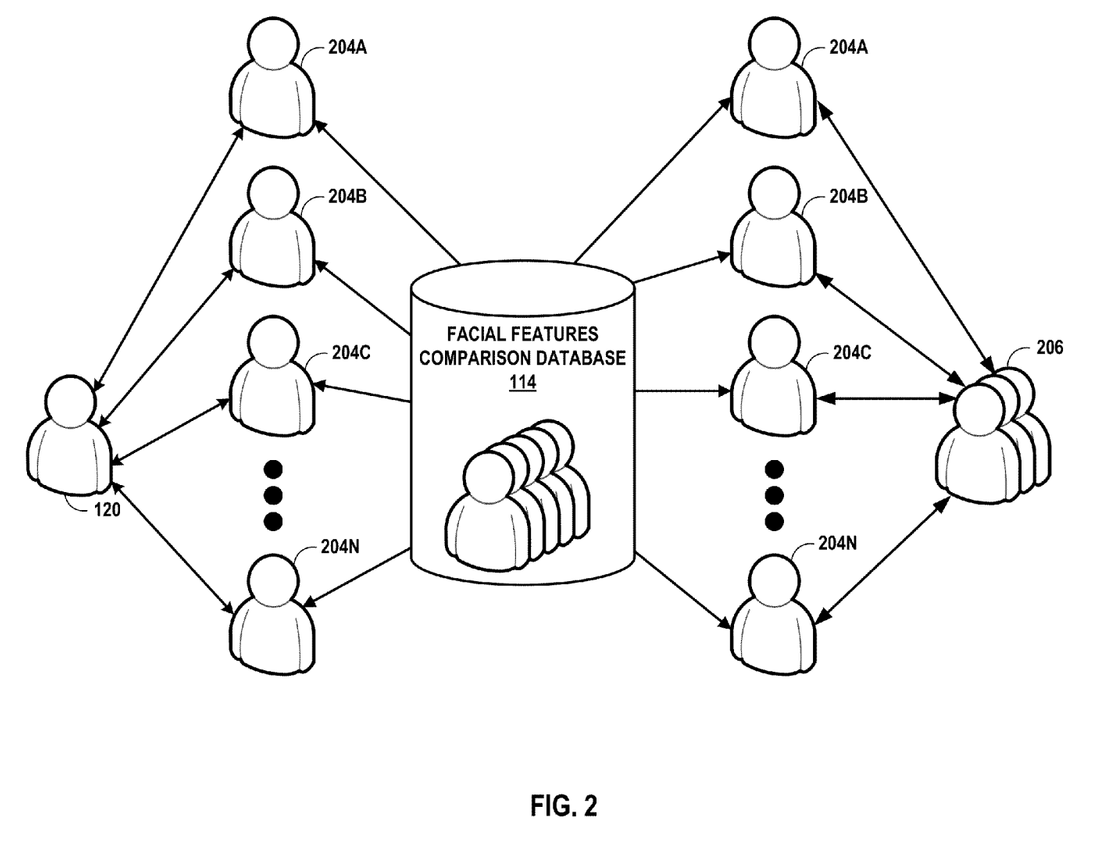
FIG. 2 is a conceptual diagram illustrating an example technique for determining a distinctiveness of facial features of a user according to one or more aspects of the present disclosure.

FIG. 2 is a conceptual diagram illustrating an example technique for determining a distinctiveness of facial features of a user according to some aspects of the present disclosure. As shown in FIG. 2, computing device 100 may compare facial features of user 120 attempting to enroll in a facial recognition system against the facial features of a plurality of individuals 204A-204N ("plurality of individuals 204") to determine the distinctiveness of user 120's facial features. Facial features comparison database 114 of computing device 100 shown in FIG. 1 may store the facial features of plurality of individuals 204, including storing data regarding those facial features such as one or more face templates. In some examples, the technique illustrated in FIG. 2 may be performed by facial comparator 112 of computing device 100 shown in FIG. 1. In some examples, comparison facial features database 114 may store the facial features of over 100, 000 users. In some examples, the facial features comparison database 114 may store the facial features of over 100, 1000, 10,000, or 1,000,000 individuals.

The facial features of the plurality of individuals 204 may be diverse, so that there are, for example, a wide range of gender, ethnicity, age, lighting, poses, and the like represented in the facial features of the plurality of individuals 204. Comparing the facial features of user 120 against a diverse population of facial features may increase the reliability of the distinctiveness determination for the facial features of user 120 compared to a relatively smaller or relatively less diverse population of facial features because there is a possibility that the facial features omitted from the smaller or relatively less diverse population of facial features may be relevant in determining the distinctiveness of the facial features of user 120.

In comparing facial features of user 120 against facial features of the plurality of individuals 204, facial features of user 120 may initially be compared to the individual in the plurality of individuals 204 having the least distinctive facial features out of the individuals 204. For example, a threshold similarity score may be associated with each individual in the plurality of individuals 204, and facial features of user 120 may initially be compared to the user in the plurality of individuals 204 having the highest threshold similarity score because the individual that has the least distinctive facial features may be the individual that has the highest corresponding threshold similarity score. On the other hand, the individual that has the most distinctive facial features may also be the individual that has the lowest threshold similarity score. In the example shown in FIG. 2, individual 204A may have the least distinctive facial features out of the individuals 204. Thus, facial features of user 120 may initially be compared to facial features of individual 204A in the example shown in FIG. 2, including comparing face templates associated with user 120 with face templates associated with individual 204A, and a similarity score may be determined for facial features of user 120 as compared to facial features of individual 204A.

After comparing user 120's facial features with individual 204A's facial features, facial features of user 120 may then be compared against facial features out of the remaining facial features of individuals 204 (e.g., the facial features in facial features comparison database 114 that have not yet been compared to the facial features of user 120) who are the most distinct from facial features of individual 204A. In the example shown in FIG. 2, individual 204B may be the remaining user in the plurality of individuals 204 having facial features that are the most distinct from facial features of individual 204A. For example, the facial features of individual 204B may be chosen out of individuals 204 as being most distinct from the facial features of individual 204A because the facial features of individual 204B may have a threshold similarity score that is the most different out of individuals 204 from the threshold similarity score of individual 204A. Thus, facial features of user 120 may be compared to facial features of individual 204B, including comparing face templates associated with user 120 to face templates associated with individual 204B, after user 120's facial features have been compared with facial features of individual 204A, and a similarity score may be determined for facial features of user 120 compared to the facial features of individual 204B.

After comparing user 120's facial features with individual 204B's facial features to determine the similarity between those facial features, facial features of user 120 may be compared with facial features out of the remaining facial features of individuals 204 (i.e., the facial features in facial features comparison database 114 that have not yet been compared to the facial features of user 120) that are the most distinct from facial features of individual 204B. In the example shown in FIG. 2, individual 204C may be the user remaining in the plurality of individuals 204 having facial features that are the most distinct from the facial features of individual 204B and individual 204A. For example, the facial features of individual 204C may be chosen out of individuals 204 as being most distinct from the facial features of individual 204B and 204A because the facial features of individual 204C may have a threshold similarity score that is the most different out of individuals 204 from the threshold similarity score of individual 204B and individual 204A. Thus, facial features of user 120 may be compared to facial features of individual 204C, including comparing face templates associated with user 120 with face templates associated with individual 204C, after facial features of user 120 has been compared with facial features of individual 204B, and a similarity score may be determined for facial features of user 120 compared to facial features of individual 204C. The process of comparing facial features of user 120 against facial features of the plurality of individuals 204 may continue in the same fashion as described above until facial features of user 120 has been compared to facial features of each of the plurality of individuals 204 and an average distinctiveness has been determined for facial features of user 120 compared to facial features of each of the plurality of individuals 204.

In some examples, the mapping from average similarity scores with the plurality of individuals 204 to adjustments in the threshold similarity scores of users may be determined based at least in part on comparing facial features of individuals other than user 120, such as a set of individuals 206 that comprise a plurality of individuals whose facial features are not included in facial features comparison database 114, with the facial features in facial features comparison database 114. Similar to the process of comparing user 120 with each of the plurality of individuals 204, each of the set of individuals 206 may be compared with each of the plurality of individuals 204 to determine an average similarity score for each of the set of individuals 206 against the plurality of individuals 204. If each of the set of individuals 206 is associated with a threshold similarity score with a specified false acceptance rate, then a mapping of average similarity score to a threshold similarity score with that false acceptance rate may be determined. Such a mapping of average similarity scores to threshold similarity scores may be determined during configuration or initial setup of the facial recognition system in computing device 100.

In some other examples, alternative techniques may be used to determine the threshold similarity score for user 120. For example, the threshold similarity score for user 120 may be based at least in part on the minimum similarity score and/or the maximum similarity score generated for user 120 when compared to the plurality of individuals 204. For example, if the maximum similarity score generated for user 120 is higher than the default threshold similarity score, with a higher similarity score indicating a higher level of similarity between facial features, then the threshold similarity score for user 120 may be adjusted upwards so that the threshold similarity score is at least as high as the maximum similarity score generated for user 120. Conversely, if the maximum similarity score generated for user 120 is lower than the default threshold similarity score, with a lower similarity score indicating a lower level of similarity between facial features, then the threshold similarity score for user 120 may be adjusted downwards so that the threshold similarity score is as low as the maximum similarity score generated for user 120.

In some examples, determining the threshold similarity score for user 120 may include adjusting a default threshold similarity score. For example, if similarity scores range from 0 to 10, with a score of 0 denoting the least amount of similarity and with a score of 10 denoting the most amount of similarity, a score of 7 may be an example default threshold similarity score initially assigned to enrolling user 120. If the facial features of user 120 are determined to be less distinctive according to the techniques illustrated above, the threshold similarity score for user 120 may be adjusted upwards from the default threshold similarity score of 7. In some examples, the threshold similarity score for the facial features of user 120 may be increased above a default threshold similarity score if the distinctiveness of the facial features of user 120 is below a specified threshold (e.g., the average similarity score of the facial features of user 120 as compared to the plurality of individuals 204 is above a specified threshold).

Similarly, if the facial features of user 120 are determined to be more distinctive according to the techniques illustrated above, the threshold similarity score for user 120 may be adjusted downwards from the default threshold similarity score of 7. The amount of downward adjustment from the default threshold similarity score may depend on the similarity of enrolling users 202 to the facial features in facial features comparison database 114. For example, the amount may be based on the difference between the average similarity score of user 120 and the average of the average similarity score for the set of individuals 206. In some examples, the threshold similarity score for the facial features of user 120 may be decreased below a default threshold similarity score if the distinctiveness of the facial features of user 120 is above a specified threshold (e.g., the average similarity score of the facial features of user 120 as compared to the plurality of individual 204 is below a specified threshold).

After a threshold similarity score is determined for user 120, user 120 may be successfully enrolled into the facial recognition system. The facial recognition system may be useful for, in some examples, using facial recognition to grant access to computing device 100.

Figure 3:
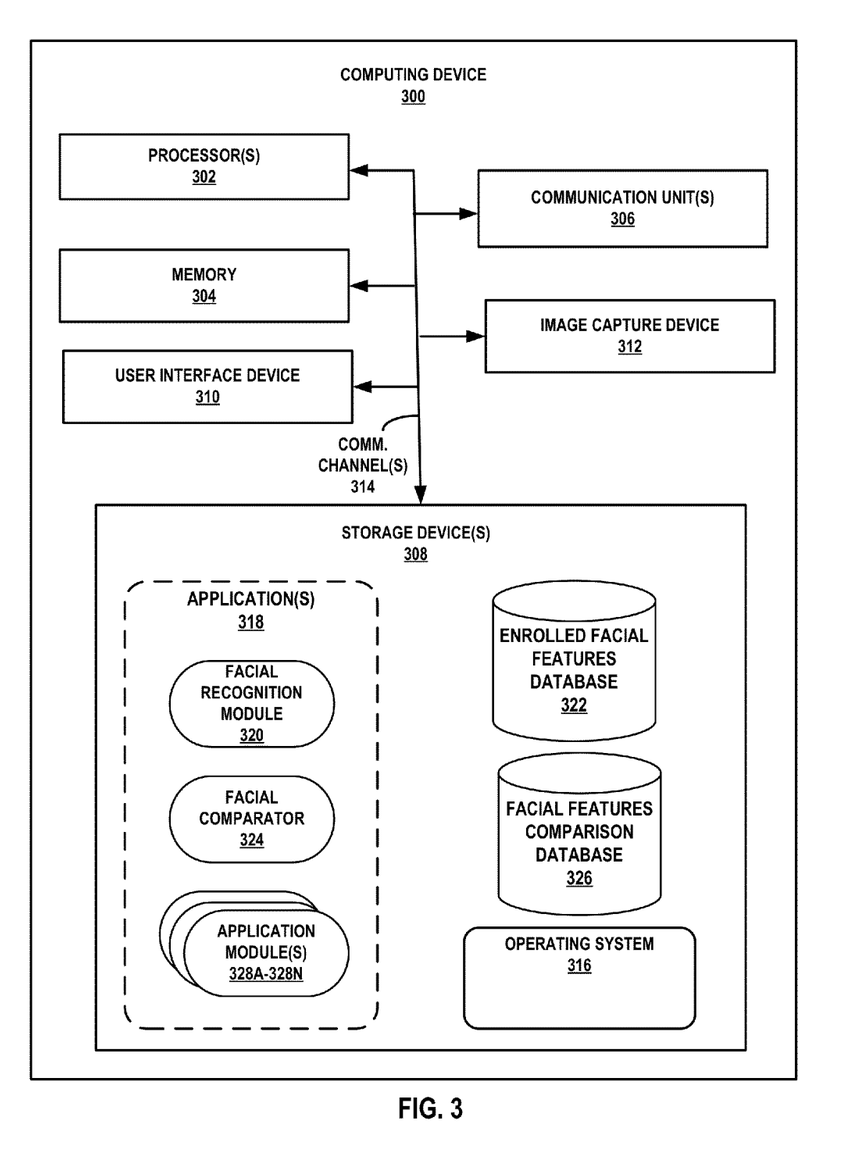
FIG. 3 is a block diagram illustrating further details of one example of a computing device according to one or more aspects of the present disclosure.

FIG. 3 is a block diagram illustrating further details of one example of computing device 300, such as computing device 100 shown in FIG. 1, according to some aspects of the present disclosure. FIG. 3 illustrates only one particular example of computing device 300. Many other example embodiments of computing device 300 may be used in other instances.

As shown in the specific example of FIG. 3, computing device 300 may include one or more processors 302, memory 304, a communication unit 306, one or more storage devices 308, user interface 310, and image capture device 312. Computing device 300 may also include an operating system 316. Computing device 300, in one example, may further include one or more applications 318, such as facial recognition module 320. One or more applications 318 may also be executable by computing device 300. The components of computing device 300 may be interconnected (physically, communicatively, and/or operatively) by one or more communication channels 314 for inter-component communications. One or more communication channels 314 may include a system bus, network connection, interprocess communication data structure, or any other channel for communicating data. One or more applications 318 and operating system 316 may also communicate information with one another as well as with other components in computing device 300.

One or more processors 302, in one example, may implement functionality and/or process instructions for execution within computing device 300. For example, one or more processors 302 may be capable of processing instructions stored in memory 304 and/or instructions stored on one or more storage devices 308.

Memory 304, in one example, may store information within computing device 300 during operation. Memory 304, in some examples, may represent a computer-readable storage medium. In some examples, memory 304 may be a temporary memory, meaning that a primary purpose of memory 304 may not be long-term storage. Memory 304, in some examples, may be described as a volatile memory, meaning that memory 304 may not maintain stored contents when computing device 300 is turned off. Examples of volatile memories may include random access memories (RAM), dynamic random access memories (DRAM), static random access memories (SRAM), and other forms of volatile memories known in the art. In some examples, memory 304 may be used to store program instructions for execution by one or more processors 302. Memory 304, in one example, may be used by software or applications running on computing device 300 (e.g., one or more applications 318) to temporarily store data and/or instructions during program execution.

One or more storage devices 308, in some examples, may also include one or more computer-readable storage media. One or more storage devices 308 may be configured to store larger amounts of information than memory 304. One or more storage devices 308 may further be configured for long-term storage of information. In some examples, one or more storage devices 308 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 300 may utilize communication unit 306 to communicate with external devices (not shown) via one or more networks, such as one or more wireless networks. The external devices may include, for example, server computers, mobile phones, networked computing devices, etc. Communication unit 306 may include one or more of a network interface card, such as an Ethernet card, an optical transceiver, a radio frequency (RF) transceiver, cellular network interface, or any other type of device that can send and receive information. Examples of wireless communication interfaces may include Bluetooth, RF, and WiFi. Any applications implemented within or executed by computing device 300 (e.g., one or more applications 318) may be implemented or contained within, operable by, executed by, and/or be operatively coupled to processor(s) 302, communication unit 306, and/or storage device 308.

Computing device 300 may also include user interface 310. User interface 310 may include one or more input devices. Input device, in some examples, may be configured to receive input from a user through tactile, electromagnetic, audio, and/or video feedback. Examples of input device may include a touch-sensitive display, mouse, keyboard, voice responsive system, video camera, microphone or any other type of device for detecting gestures by a user. In some examples, a touch-sensitive display may include a presence-sensitive screen.

User interface 310 may also include one or more output devices. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output device may include a speaker, a cathode ray tube (CRT) monitor, a liquid crystal display (LCD), or any other type of device that can generate intelligible output to a user.

Computing device 300, in some examples, may include image capture device 312. Image capture device 312 may be a camera, such as a digital camera, a still camera, a motion picture camera, and the like. Image capture device 312 may also be any other device capable of capturing and storing still or moving images. In some examples, image capture device 312 may be capable of digitally recording images via an electronic image sensor.

Computing device 300, in some examples, may include power source 314, which may be rechargeable and provide power to computing device 300. Power source 314, in some examples, may be a battery made from nickel-cadmium, lithium-ion, or other suitable material.

Computing device 300 may include additional components that, for clarity, are not shown in FIG. 3. For example, computing device 300 may include a battery to provide power to the components of computing device 300. Similarly, the components of computing device 300 shown in FIG. 3 may not be included in every example of computing device 300. For instance computing device 300 may not, in all examples, include communication unit 306.

Examples of computing device 300 may include operating system 316. Operating system 316 may be stored in one or more storage devices 308 and may control the operation of components of computing device 300. For example, operating system 316 may facilitate the interaction of one or more applications 318 with hardware components of computing device 300.

As shown in FIG. 2, one or more applications 318 may include facial recognition module 320. Facial recognition module 320 may include program instructions and/or data that are executable by one or more processors 302 of computing device 300. For example, facial recognition module 320 may include instructions that cause one or more applications 318 executing on computing device 300 to perform one or more of the operations and actions described in FIGS. 1-4. In some examples, facial recognition module 320 may comprise a facial recognition system.

In some examples, facial recognition module 320 may be configured to allow or deny access to one or more functionalities of computing device 300 (e.g., allow or deny access to application modules 328A-328N) by identifying an authorized user of computing device 300. The identifying of the authorized user may be based on extracting facial features from one or more images of an accessing user captured by image capture device 312, creating face templates based on the extracted facial features, and comparing the face templates with the face templates of authorized users stored in enrolled facial features database 322. Facial recognition module 320 may compare the face templates of the accessing user against the face templates in enrolled facial features database 322, and may generate a similarity score for each comparison. If a similarity score generated for the face templates of the accessing user and an authorized user's face templates exceeds the threshold similarity score for that authorized user's face templates, facial recognition module 320 may consider the face templates of the accessing user to match the authorized user's face templates, and may allow the accessing user access to computing device. Facial recognition module 320 may also provide an enrollment process so that users, such as user 120 shown in FIG. 1, may enroll their facial features as face templates into enrolled facial features database 322. One example of an enrollment process may include capturing one or more images of the face of a user, analyzing the captured images to extract facial features, storing the facial features in enrolled facial features database 322 as one or more face templates, and determining a threshold similarity score for the facial features of the user.

Facial recognition module 320 may store the enrolled facial features of authorized users as face templates in enrolled facial features database 322. In some examples, storing the enrolled facial features may include storing information regarding the nose, eyes, mouth, nostrils, chins, forehead, eyebrows, cheekbones, and the like, including characteristics such as the position, size, and the relationship among those features. Facial features stored in enrolled facial features database 322 may also include facial characteristics, such as lines, curves, edges, points, areas, and the like, as well as spatial frequencies of image intensities and colors on the face stored as face templates. The features extracted from the faces of users by facial recognition module 320 may be stored as a face template in enrolled facial features database 322 for use during a facial recognition authentication process by facial recognition module 320. In some examples, enrolled facial features database 322 may also store threshold similarity scores associated with each authorized user.

In some examples, storing the enrolled facial features in enrolled facial features database 322 may include storing, in enrolled facial features database 322, one or more values representing the facial features of each authorized user. The facial features stored in enrolled facial features database 322 may be retrieved by facial recognition module 320 so the facial features may be compared against facial features extracted from one or more images captured by image capture device 312 to determine whether a user attempting to access computing device 300 should be allowed access to computing device 300. In some examples, facial features database 320 may also store threshold similarity scores for each authorized user.

One or more applications 318 may include facial comparator 324. Facial comparator 324 may be an application operable by one or more processors 302 and may be configured to determine distinctiveness of a user's facial features by comparing the user's facial features to the facial features of a population of people with a diverse set of faces stored in facial features comparison database 326. For example, facial comparator 320 may compare the user's face templates against the face templates in facial features comparison database 326. In some examples, facial comparator 324 may generate a similarity score for each comparison between the user's face templates and each face template stored in facial features comparison database 326, and may also generate an average similarity score based on the individually generated similarity scores. The distinctiveness of the user's facial features may inversely correspond to the similarity scores of the user's facial features compared to facial features of the population of people stored in facial features comparison database 326, so that a user having facial features that are more similar to the facial features of the population of people stored in facial features comparison database 326 may be relatively less distinctive, while a user having facial features that are less similar to facial features of the population of people stored in facial features comparison database 326 may be relatively more distinctive.

Facial features comparison database 326 may be a database configured to store the facial features of a population of people with a diverse set of faces, so that there may, for example, be a wide range of gender, ethnicity, age, lighting, poses, etc. in the facial features stored in facial features comparison database 326. In some examples, facial features comparison database 326 may store face templates associated with each person in the population of people.

Any applications, e.g., one or more applications 318, implemented within or executed by computing device 300 may be implemented or contained within, operable by, executed by, and/or be operatively/communicatively coupled to components of computing device 300, e.g., one or more processors 302, memory 304, communication unit 306, one or more storage devices 308, user interface 310, and image capture device 312.

Figure 4:
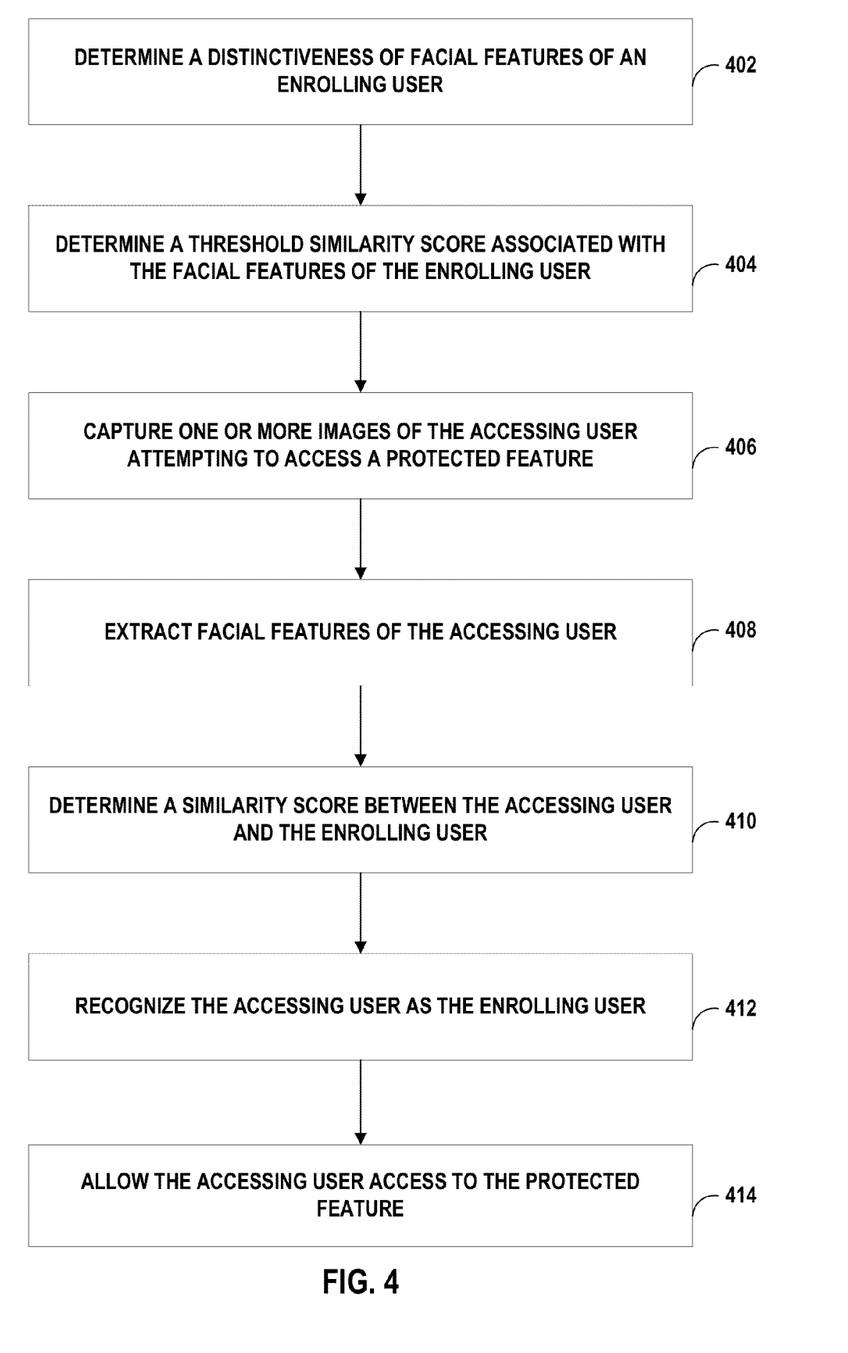
FIG. 4 is a flow chart illustrating an example operation of a process for determining a threshold similarity score associated with the facial features of a user according to one or more aspects of the present disclosure.

FIG. 4 is a flow chart illustrating an example operation of a process for determining a threshold similarity score associated with the facial features of a user according to some aspects of the present disclosure. For purposes of illustration only, FIG. 4 will be described with respect to computing device 100, though, in other examples, other systems may be used.

As shown in FIG. 4, computing device 100 may determine a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the first user (402). Computing device 100 may determine a threshold similarity score associated with the first set of facial features of the enrolling user based at least in part on the distinctiveness of the first set of facial features of the first user, wherein a second set of facial features of an accessing user matches the first set of facial features of the enrolling user if a similarity score between the first set of facial features of the first user and the second set of facial features of the accessing user exceeds the threshold similarity score for the first set of facial features (404). In some examples, image capture device 104 of computing device 100 may capture one or more images of the accessing user attempting to access a protected feature of computing device 100 (406). Computing device 100 may extract at least a portion of the second set of facial features of the accessing user from the one or more images (408). Computing device 100 may determine a similarity score between the first set of facial features of the enrolling user and at least the portion of the second set of facial features of the accessing user (410). Computing device 100 may recognize the accessing user as the enrolled user if the similarity score exceeds the threshold similarity score associated with the first set of facial features (412).

In some examples, the threshold similarity score may inversely relate to the distinctiveness of the facial features of the first user. In some examples, determining the threshold similarity score may further include increasing the threshold similarity score above a default threshold similarity score if the distinctiveness is below a specified threshold. In some examples, determining the threshold similarity score may further include decreasing the threshold similarity score below a default threshold similarity score if the distinctiveness is above a specified threshold. In some examples, determining the distinctiveness of the first set of facial features of the enrolling user may further include determining an average similarity score between the first set of facial features of the enrolling user and the facial features of the plurality of other users. In some examples, the distinctiveness may inversely relate to the average similarity score. In some examples, comparing the first set of facial features of the enrolling user to the facial features of the plurality of other users may further include comparing the first set of facial features of the enrolling user to a facial feature of a first person in the plurality of other users, wherein the facial feature of the first person is least distinctive compared to facial features of other users in the plurality of other users and comparing the first set of facial features of the enrolling user to a set of facial features of a second person in the plurality of other users, wherein the set of facial features of the second person is most distinct compared to the facial feature of other users in the plurality of other users from the facial feature of the first user, wherein a false acceptance occurs if the similarity score between the first set of facial features of the enrolling user and the second set of facial features of the accessing user exceeds the threshold similarity score for the first set of facial features of the accessing user and the accessing user is not the enrolling user.

In some examples, determining the threshold similarity score may be based at least in part on a rate of false acceptances for the threshold similarity score.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various aspects of the disclosure have been described. These and other aspects are within the scope of the following claims.

The invention claimed is:

1. A method comprising:
   determining a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the enrolling user, wherein the comparison of the first set of facial features of the enrolling user to the facial features of the plurality of other users further comprises a comparison of at least a first face template that quantifies the first set of facial features of the enrolling user to at least a second template that quantifies the facial features of the plurality of other users; and
   determining, by a computing device, a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

2. The method of claim 1, further comprising:
   capturing one or more images of the accessing user attempting to access a protected feature of the computing device;
   extracting at least a portion of the second set of facial features of the accessing user from the one or more images;
   determining a similarity score between the first set of facial features of the enrolling user and at least the portion of the second set of facial features of the accessing user;
   recognizing the accessing user as the enrolled user if the similarity score exceeds the threshold similarity score associated with the first set of facial features; and
   responsive to recognizing the accessing user as the enrolled user, allowing the accessing user access to the protected feature of the computing device.

3. The method of claim 1, wherein the threshold similarity score inversely relates to the distinctiveness of the facial features of the enrolling user.

4. The method of claim 1, wherein determining the threshold similarity score further comprises:
   increasing the threshold similarity score above a default threshold similarity score if the distinctiveness is below a specified threshold.

5. The method of claim 1, wherein determining the threshold similarity score further comprises:
   decreasing the threshold similarity score below a default threshold similarity score if the distinctiveness is above a specified threshold.

6. The method of claim 1, wherein determining the distinctiveness of the first set of facial features of the enrolling user includes:
   determining an average similarity score between the first set of facial features of the enrolling user and the facial features of the plurality of other users.

7. The method of claim 6, wherein the distinctiveness inversely relates to the average similarity score.

8. The method of claim 6, wherein comparing the first set of facial features of the enrolling user to the facial features of the plurality of other users further comprises:
   comparing the first set of facial features of the enrolling user to a first facial feature that is a least distinctive facial feature out of the facial features of the plurality of other users; and
   comparing the first set of facial features of the enrolling user to a second facial feature out of the facial features of the plurality of other users that is most distinct from the first facial feature.

9. The method of claim 1, wherein determining the threshold similarity score is based at least in part on a rate of false acceptances for the threshold similarity score, wherein a false acceptance occurs if the similarity score between the first set of facial features of the enrolling user and the second set of facial features of the accessing user exceeds the threshold similarity score for the first set of facial features of the accessing user and the accessing user is not the enrolling user.

10. A device comprising:
    at least one processor, wherein the at least one processor is configured to:
    determine a distinctiveness of a first set of facial features of an enrolling user of a facial recognition system based at least in part upon a comparison of the first set of facial features of the enrolling user to facial features of a plurality of other users, the first set facial features of the enrolling user being extracted from one or more images of the enrolling user, wherein the comparison of the first set of facial features of the enrolling user to the facial features of the plurality of other users further comprises a comparison of at least a first face template that quantifies the first set of facial features of the enrolling user to at least a second face template that quantifies the facial features of the plurality of other users; and
    determine a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

11. The device of claim 10, wherein the at least one processor is further configured to:
    capture one or more images of the accessing user attempting to access a protected feature of a computing device;
    extract at least a portion of the second set of facial features of the accessing user from the one or more images;
    determine a similarity score between the first set of facial features of the enrolling user and at least the portion of the second set of facial features of the accessing user;
    recognize the accessing user as the enrolled user if the similarity score exceeds the threshold similarity score associated with the first set of facial features; and
    responsive to recognizing the accessing user as the enrolled user, allow the accessing user access to the protected feature of the computing device.

12. The device of claim 10, wherein the threshold similarity score inversely relates to the distinctiveness of the facial features of the enrolling user.

13. The device of claim 10, wherein the at least one processor is further configured to:
increase the threshold similarity score above a default threshold similarity score if the distinctiveness is below a specified threshold.

14. The device of claim 10, wherein the at least one processor is further configured to:
decrease the threshold similarity score below a default threshold similarity score if the distinctiveness is above a specified threshold.

15. The device of claim 10, wherein the at least one processor is further configured to:
determine an average similarity score between the first set of facial features of the enrolling user and the facial features of the plurality of other users.

16. The device of claim 15, wherein the distinctiveness inversely relates to the average similarity score.

17. The device of claim 15, wherein the at least one processor is further configured to:
compare the first set of facial features of the enrolling user to a first facial feature that is a least distinctive facial feature out of the facial features of the plurality of other users; and
compare the first set of facial features of the enrolling user to a second facial feature out of the facial features of the plurality of other users that is most distinct from the first facial feature.

18. The device of claim 10, wherein the threshold similarity score is determined based at least in part on a rate of false acceptances for the threshold similarity score, wherein a false acceptance occurs if the similarity score between the first set of facial features of the enrolling user and the second set of facial features of the accessing user exceeds the threshold similarity score for the first set of facial features of the accessing user and the accessing user is not the enrolling user.

19. A computer-readable storage device containing instructions that, when executed on at least one processor, cause the at least one processor to perform operations comprising:
determining, by a computing device, a distinctiveness of a first set of facial features of an enrolling user of a facial recognition system based at least in part upon a comparison of the first set of facial features of the enrolling user to facial features of a plurality of other users, the first set of facial features of the enrolling user being extracted from one or more images of the enrolling user, wherein the comparison of the first set of facial features of the enrolling user to the facial features of the plurality of other users further comprises a comparison of at least a first face template that quantifies the first set of facial features of the enrolling user to at least a second face template that quantifies the facial features of the plurality of other users; and
determining, by the computing device, a threshold similarity score associated with the first set of facial features of the enrolling user based at least in part on the distinctiveness of the first set of facial features of the enrolling user, wherein a second set of facial features of an accessing user matches the first set of facial features of the enrolling user if a similarity score between the first set of facial features of the enrolling user and the second set of facial features of the accessing user exceeds the threshold similarity score for the first set of facial features.

20. The computer-readable storage device of claim 19, wherein the operations further comprises:
capturing one or more images of the accessing user attempting to access a protected feature of the computing device;
extracting at least a portion of the second set of facial features of the accessing user from the one or more images;
determining a similarity score between the first set of facial features of the enrolling user and at least the portion of the second set of facial features of the accessing user;
recognizing the accessing user as the enrolled user if the similarity score exceeds the threshold similarity score associated with the first set of facial features; and
responsive to recognizing the accessing user as the enrolled user, allowing the accessing user access to the protected feature of the computing device.

21. The computer-readable storage device of claim 19, wherein the threshold similarity score inversely relates to the distinctiveness of the facial features of the enrolling user.

22. The computer-readable storage device of claim 19, wherein determining the threshold similarity score further comprises:
increasing the threshold similarity score above a default threshold similarity score if the distinctiveness is below a specified threshold.

23. The computer-readable storage device of claim 19, wherein determining the threshold similarity score further comprises:
decreasing the threshold similarity score below a default threshold similarity score if the distinctiveness is above a specified threshold.

24. The computer-readable storage device of claim 19, wherein determining the distinctiveness of the first set of facial features of an enrolling user includes:
determining an average similarity score between the first set of facial features of the enrolling user and the facial features of the plurality of other users.

25. The computer-readable storage device of claim 24, wherein the distinctiveness inversely relates to the average similarity score.

26. The computer-readable storage device of claim 24, wherein comparing the first set of facial features of the enrolling user to the facial features of the plurality of other users further comprises:
comparing the first set of facial features of the enrolling user to a first facial feature that is a least distinctive facial feature out of the facial features of the plurality of other users; and
comparing the first set of facial features of the enrolling user to a second facial feature out of the facial features of the plurality of other users that is most distinct from the first facial feature.

27. The computer-readable storage device of claim 19, wherein determining the threshold similarity score is based at least in part on a rate of false acceptances for the threshold similarity score, wherein a false acceptance occurs if the similarity score between the first set of facial features of the enrolling user and the second set of facial features of the accessing user exceeds the threshold similarity score for the first set of facial features of the accessing user and the accessing user is not the enrolling user.

* * * * *